United States Patent
Osgood

[11] Patent Number: 5,802,895
[45] Date of Patent: Sep. 8, 1998

[54] HOLE-BLOCKING DEVICE

[76] Inventor: Timothy C. Osgood, 21 E. Woodside, Holland, Ohio 43528

[21] Appl. No.: 779,307

[22] Filed: Jan. 6, 1997

[51] Int. Cl.⁶ .................................................. E05B 65/12
[52] U.S. Cl. ......................... 70/259; 224/42.25; 414/463
[58] Field of Search .................. 70/259, 260; 224/42.21, 224/42.23, 42.25; 414/463

[56] References Cited

U.S. PATENT DOCUMENTS

| | | | |
|---|---|---|---|
| 3,130,571 | 4/1964 | Neumann | 70/58 |
| 3,449,774 | 6/1969 | Wilham | 411/34 X |
| 3,492,909 | 2/1970 | Triplett | 411/34 |
| 4,035,921 | 7/1977 | Williams | 70/167 X |
| 4,988,023 | 1/1991 | Heathcoat | 70/259 X |
| 5,077,995 | 1/1992 | Appelbaum | 70/259 |
| 5,253,962 | 10/1993 | Close, Jr. | 411/34 |
| 5,261,259 | 11/1993 | Ployd | 70/58 |
| 5,343,722 | 9/1994 | Richardson | 70/259 |
| 5,426,963 | 6/1995 | Tafoya et al. | 70/259 |
| 5,477,711 | 12/1995 | Oliveri | 70/259 X |

Primary Examiner—Lloyd A. Gall
Attorney, Agent, or Firm—Paul F. Stutz

[57] ABSTRACT

This application discloses novel device for blocking an access port in a vehicle bumper featuring a linear member carrying an elastically expandable element at one end and lug-key actuation mechanism at the other end, and adapted for insertion through the hole and thence, actuation of key lug to thereby expand expandable element to thereby block access through the hole.

7 Claims, 1 Drawing Sheet

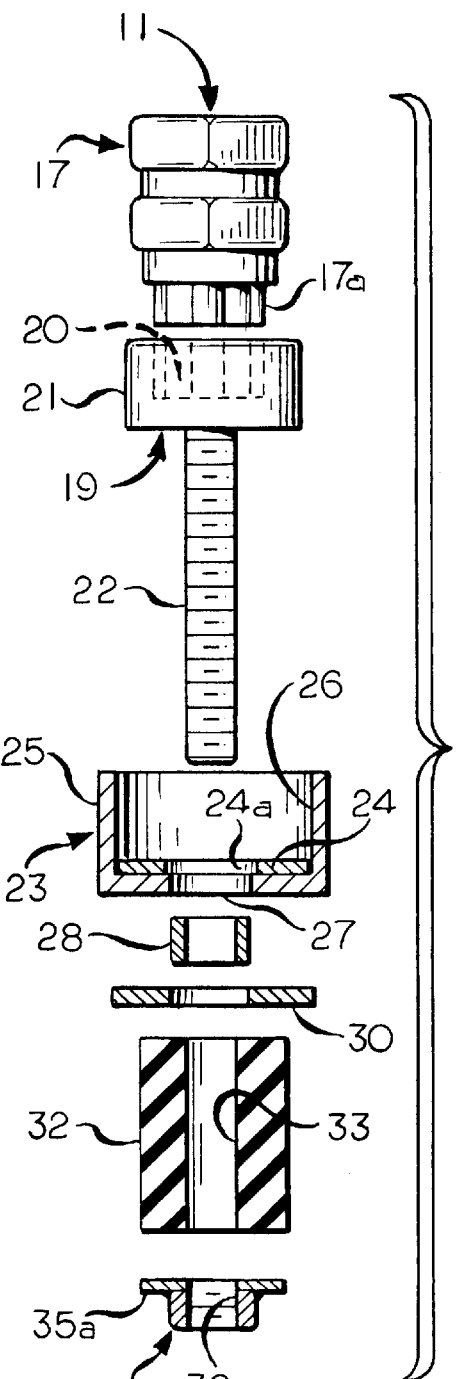
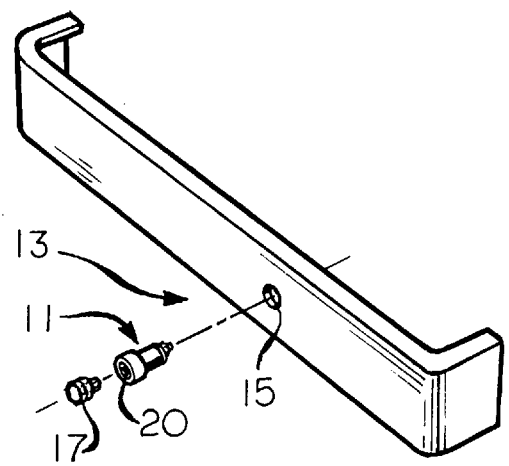
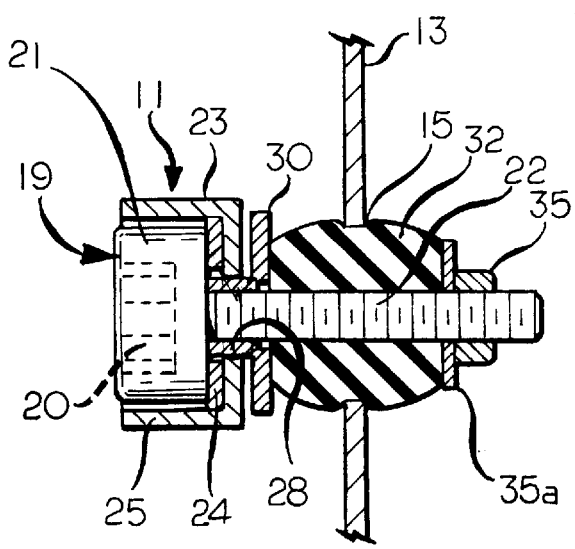
FIG. 1
FIG. 2
FIG. 3

HOLE-BLOCKING DEVICE

BACKGROUND OF THE INVENTION

The present invention relates to a plug-like device for blocking access to a hole in a structure such as a bumper of a vehicle, or more specifically, a pick-up truck which by reason of it's inherent design does not have a trunk for storage of the spare tire. The latter, e.g., pick-up trucks, thus frequently embody a dirigibly recessed, storage arrangement for the spare tire and wheel assembly located beneath the vehicle frame.

The storage arrangement, for the spare tire carrier, includes a cable hoist in the nature of an elevator mechanism, a drive shaft and a gear box together with accessory components actuable to raise and lower the spare tire and wheel from an upper storage position to a lower access position on the ground. The raising and lowering is accomplished by a linear tool adapted to extend through said hole in said bumper and which is inclusive of one end engagable with the elevator mechanism and the other end having means for turning the tool after engagement with the mechanism to effect lowering or raising of the wheel/tire carrier depending upon the clockwise or counterclockwise rotation or cranking of the tool.

The linear tool is designed, as indicated, to extend through an aperture or hole purposely formed in the bumper in order that the tool may engage the engagement means in a level, or horizontal, fashion for convenient and efficient rotation or cranking and consequent raising and lowering of the spare wheel.

Unfortunately, unlicensed use of such tool by a stranger can result in loss of the entire tire and wheel assembly resulting in an economic loss to the owner of the truck, and, as well, exposure to vulnerability in the absence of a spare tire and wheel which may be needed when the owner/operator is in a location otherwise remote from help, resulting in being stranded, inconvenienced, even endangered, in addition to the economic loss.

DESCRIPTION OF THE PRIOR ART

A number of patents are known which address the aforesaid general problem by various means for locking the elevator mechanism, as disclosed in the following patents.

U.S. Pat. No. 4,526,021 discloses a locking mechanism which is directly connected to the elevator mechanism located underneath the truck, and therefore inaccessible and inconvenient to the user.

U.S. Pat. No. 4,768,361 discloses a lock which attaches to the hoist chain and is likewise inaccessible and inconvenient.

U.S. Pat. No. 4,794,771 discloses a device to be employed very close/proximate to the spare wheel and is extremely inconvenient.

U.S. Pat. No. 4,848,113 discloses a lock member mounted on the input shaft of a winch and being generally inaccessible and therefore inconvenient.

U.S. Pat. No. 4,988,023 discloses a locking mechanism requiring a hammer to drive a blade into the marginal end of a shaft component forming the side walls and is otherwise inaccessible and inconvenient.

U.S. Pat. No. 5,077,995 discloses a cylindrical/tubular latch rod adapted to engage the beveled end of the hoist shaft and generally operates by blocking the crank end of the lowering crank.

U.S. Pat. No. 5,199,287 features the combination of a rod and a padlock and relies upon contact between the rod and the cranking mechanism.

U.S. Pat. No. 5,211,043 also discloses an elongate tool device which engages the cranking arm and employs a padlock.

U.S. Pat. No. 5,330,313 discloses a stubby shaft engaging the crank mechanism and a padlock.

U.S. Pat. No. 5,343,722 also discloses a shaft and padlock arrangement.

U.S. Pat. No. 5,426,963 discloses a hole blocking, lock mechanism consisting of a plate and a shaft requiring a padlock to prevent it's removal.

U.S. Pat. No. 5,477,711 discloses a key and plug combination which engages a domed head on the other side of the static wall structure and is otherwise rather over-complicated to enjoy universal acceptance.

It is perceived that none of the structures disclosed by the foregoing U.S. Patents embody the features of novelty employed in the blocking device of the present invention, nor do they disclose or anticipate the simplicity of my device, nor the ready accessibility and ease of use of the self-contained device of the present invention.

OBJECTS

It is thus an object of the present invention to provide an extremely simple device of generally tubular configuration, being characterized by a paucity of parts, ready availability and accessibility, and embodying a high degree of simplicity, uniqueness and novelty together with sure and certain operability, as to merit general acceptance by the purchasing public interested in a self-contained, secure device which is easy to operate, of low-cost, and of simple, trouble-free construction; all without the use of a separate padlock.

It is a particular object of the present invention to provide a device which is extremely simple in terms of construction and ease of use.

It is another object of the present invention to provide a novel device which incorporates, as component's thereof, readily available parts which are combined in a novel fashion to allow accomplishment of the desired utility.

It is yet another object of the present invention to provide a device which is readily accessible, easy to install and to remove, and, significantly, not requiring the user to crawl under the vehicle as required by many of the devices disclosed in the prior art.

It is a still further object of the present invention to provide an aperture blocking device/apparatus which is extremely economical by reason of the simplicity of it's components and its' novel features of construction and assembly.

The above enumerated and, as well, other objects of the present invention, will become apparent from the following detailed description of the present invention, taken in conjunction with the annexed sheet of drawings on which there is presented, for purposes of illustration only, a preferred embodiment of the hole/aperture-blocking device of the present invention.

BRIEF DESCRIPTION IN THE DRAWINGS

FIG. 1 is a three-quarter perspective view, partially exploded, for purpose of clearly illustrating the device of the present invention and its use in it's usual and intended application.

FIG. 2 is a partially sectional view of the present device shown with the individual parts in spaced, unassembled relationship in order to illustrate clearly the details of individual component parts of the device of the present invention arranged in the sequence of assembly.

FIG. 3 is a sectional view of the device of the present invention shown with the parts operatively assembled and in "locking" mode, said view being close to actual size, but slightly smaller in the interest of conserving space on the sheet of drawings.

SUMMARY AND BRIEF DESCRIPTION OF THE INVENTION

The device of the present invention incorporates a readily/commercially available lug-nut locking mechanism fixedly secured to a threaded shaft, a rotatable, cup-shaped shield protectively surrounding the lug nut mechanism, a tubular spacer device slidable on said threaded shaft, together with a pair of spaced washers on either side of an annular segment of a rubber-like material, and lastly a terminal nut threadingly carried by said threaded shaft, such that rotation of the lug nut/shaft member causes the washers to be forced into a gradual, closing relationship, thereby compressing the annular rubber segment causing it to expand radially outwardly to a size greater than that of the aperture through which the plug-like device of the present invention is to be inserted in the manner shown in the drawings.

DESCRIPTION OF THE PREFERRED EMBODIMENTS DETAILED DESCRIPTION OF THE INVENTION

Referring now more specifically to the drawings, reference is initially directed to FIG. 1, wherein is disclosed, in perspective fashion, a bumper 13 normally located at the rear of a vehicle, such as the pick-up truck, for which the present invention is ideally adapted. The bumper 13 includes an access port 15 which extends through the thickness of the bumper and serves as a passage-way for a linear tool (not shown) having at one end an arrangement for crankingly engaging the elevator mechanism for raising and lowering the spare wheel tire assembly; while the other outer end is of a configuration including a crank end or offset handle which permits the entire linear tool to be rotated clockwise or counterclockwise as desired.

In the interest of simplicity, and since it plays no part of the present invention, the linear, crankable, raising and lowering tool, and the elevator mechanism for the tire and wheel assembly, are not shown, albeit reference can be made to many of the prior art patents referred to hereinabove for purposes of discerning that needed for any further understanding of the nature of the present invention.

Further in FIG. 1, there is disclosed a plug-like, tubular, aperture-blocking mechanism 11 of the present invention shown in spaced, axial alignment with the axis of the access port 15 and located outward therefrom. An axially aligned lug key 17 when engaged with the socket/recess 20 of mechanism 11, allows the device to be rotated in clockwise fashion to actuate the locking feature of the present invention in a manner as will be described in more detail hereafter.

As indicated earlier, the device 11 of the present invention is shown with it's parts in vertical, slightly spaced relationship in FIG. 2; while the same parts are shown in assembled relationship and in locking engagement with the bumper 13 in FIG. 3. These views clearly illustrate the simplicity of the device of the present invention, as evidenced by the very few parts of which composed, serving principally as a carrier/mount for the annular length/segment 32 of a compressible, rubber-like composition sized to fit through the access port 15, but when enlarged through compression thereof via actuation of the device; said annular segment expands radially outwardly to engage the edge of the access port in a manner as prevents withdrawal of the device thereby blocking/locking the access port from entry by any tool or the like.

A principal component of the plug device 11 of the present invention is the threaded lock member 19 featuring an integral cap-head 21 at one end of a threaded shaft 22. The cap head 21 has a recessed novelly shaped hole/recess 20, as shown, which receives an identically contoured lug nut 17a which is a part of the lug key 17 having a hex head 17b accomodating a crescent wrench or the like (not shown).

A cup-shaped cover, 23 includes annular flange 25, an internal washer 24, and a central aperture 27 adapted to receive the threaded shaft 22.

A small tubular member 28 serves as a spacer.

Reference numeral 30 identifies an annular backup washer, while reference numeral 32 identifies the annular length of compressible, rubber-like material, featuring a central axial bore 33 slidingly receiving threaded shaft 22.

Reference numeral 35 identifies a lock nut featuring an integral, flared flange segment 35a and an inner threaded bore 36 engaging the shaft 22.

In assemblement; the threaded lock member 19 extends through the aperture 27 of cap 23, the spacer 28, the washer 30, the annular segment of rubber 32, and thence the terminal end of the threaded shaft 22 engages the lock nut 35.

It is a significant feature of the present invention to provide for the cup-shaped cover 23 which, in assembled relationship, as shown in FIG. 3, locates the cap-head 21 in recessed position to provide a covering, protective shield preventing any turning of the cap-head by a pipe wrench or similar tool. The device 11 is actuated via the lug key 17 featuring the unique lug key configuration 17a which is machined to identically match the unique interior configuration of the socket/recess 20 in the terminal end of the cap head 21. The plug-like, lug key member 17 is adapted to turn via use of appropriately adjusted crescent wrench, lug nut wrench, or the like, to effect continuing threaded engagement with the lock nut 35 which causes the backup washer-like flange 35a, integrally connected to the lock nut 35 to advance on the threaded shaft in the direction of the first backup washer 30. This movement compresses the annular rubber piece 32 in-between the washers 30 and 35a as mentioned, causing a radial expansion of the rubber segment 32 into engagement with the edge defining the access port 15 of the bumper 13.

Although not shown, in the interest of simplicity and brevity, the device as shown in FIG. 3 may, in fact, be inserted further to the right, whereby the washer 30 will be in fairly close proximity to the bumper 13.

In such position almost the entire rubber component 32 will be on the backside of the bumper; albeit the results will be the same, namely, that the compression of the rubber segment 32 effected by clockwise cranking of the lug key 17 situated in the socket/recess 20 will cause radial outward movement of the rubber segment 32 to the point that it's increased size will not allow the locking device 11 to be removed.

Of course, intended removal can be accomplished by one having the proper lug key 17 congruently matching the socket/recess 20 and therefore appropriately insertable into the said socket/recess 20 of the cap head 21; whereupon a suitable wrench can be employed via hex head 17b to effect counterclockwise movement of the lug key 17 which will cause counterclockwise movement of the threaded shaft in the lock nut 35, whereby the distance between the washers 30 and 35a will return to a greater or increased spaced-apart position allowing the compressed rubber segment 32 to elastically return to it's normal size and configuration as shown in FIG. 2, whereupon, the entire assembly 11 can be removed from the access port 15. Subsequently, the appropriate linear tool (not shown) can be inserted through the access port 15 to engage the operative mechanism of the elevator carrying the spare tire and wheel assembly. Rotation of the crank end of the linear tool will cause the tire and wheel carrier assembly to be lowered to the ground where the replacement wheel and tire may be removed for mounting on the vehicle and replaced with the damaged or deflated tire and wheel requiring repair. The replacement as described allows the vehicle to be safely operated and driven in the usual manner.

The foregoing description taken in conjunction with the drawings amply illustrates both the simplicity of the device itself and the conventiality of the component parts as lend and provide the economy inherent in the production of the device of the present invention.

The device can be operated strictly from the rear of the vehicle employing the device 11 and the lug key 17. One is not obliged to reach behind the bumper, or extend oneself to reach the cranking mechanism for release of a lock of the type shown in the prior art.

In a preferred embodiment of the present invention one employs available security-type lug nuts as the lug key component 17 of the device of this invention. Normally these are used in fastening tire/wheel assemblies to the usual hub at the end of the front and rear shafts of the vehicle.

Security of the tire/wheel assembly is achieved by the fact that only one having the appropriate matching lock lug key 17 may loosen the device 11 of the present invention and remove same in the manner described hereandbefore.

While the device 11 allows the cap head 23 to be exposed on the outside of the bumper, the cup-shaped cover 23 includes the annular flange 25 which prevents gripping contact of the outer surface of the cap head 21 by any usual tool in the possession of a stranger with theft in mind.

Generally, the materials of construction for making the device of the present invention do not play a significant part of the present invention other than respecting the annular, rubber-like member 32 whose compressibility and consequent radial expansion form the crux of the locking function as described herein. In this respect, while rubber has been mentioned, there are other compressible materials, such as certain resilient plastic materials, e.g. vinyls, polyurethanes, natural and synthetic rubbers, that would be suitable so long as they have the character or property of being compressible axially and elastically expandable radially.

In terms of materials of construction for the device 11 of the present invention one most usually thinks in terms of metals such as, steel or brass, and these may, of course, be used for all of the components of the present invention excepting the annular rubber component 32 which is desirably formed of a rubber compound of such durometer to exhibit the proper compressibility in an axial direction, and corresponding expandability in a radial direction as indicated in the drawing.

Strength, in terms of the other component parts, is desirable from the standpoint of accessibility and therefore the various metals are likely preferred. Desirably, the metals would be such as to be platable for appearance's sake as, for example, by a chrome plating operation which in addition to a desirably shiny appearance, provides a protection against oxidation, deterioration commonly known as rusting, which would detract from the appearance and, as well, the life of the device.

While metals may be preferred, from this point of view, there are a number of synthetic/plastic materials which possibly can be employed, such as the acrylonitrile-butadiene-styrene materials, known in the trade as ABS plastics. Polycarbonates, iso-butylenes and other plastics known in the industry may, under certain circumstances, be substituted for one or the other of the metal components.

It is also envisioned that some of the parts might be made of metal and some of the parts made of plastic to achieve the proper balance of appearance, ease of movement or rotation and strength. Polyethylene is also a suitable material, for some of the parts with due consideration being given to the strength and toughness as necessary, and, as well, machinability factors.

From the foregoing detailed description, taken in conjunction with the drawings, it will be appreciated that many modifications and substitutions of parts in arrangement may be obviously suggested and easily resorted to by one skilled in the art, all without departing from the spirit and/or scope of the present invention. All such modifications, equivalent substitutions and/or other minor departures from the explicit description and language employed hereinabove, are intended to be considered as included within the present invention, unless to do so would do violence to the language of the appended claims.

I claim:

1. In combination, a vehicle having an access port for a linear tool employed to raise and lower a vehicle spare tire/wheel assembly from a storage position under said vehicle, and a locking/blocking device for said access port comprising, an elongate shaft, an expandable, plug-like member carried by said shaft, and adapted to be inserted through said access port, said shaft including a terminal end cap including a recess configurated to receive a key means actuable to translate a turning action on said shaft to radial expansion of said plug-like member to a size incapable of being removed from said access port; and said key means being actuable in reverse fashion, thereby to reduce the size of said plug-like member to it's original size whereby it is capable of being removed from said access port, thereby allowing access to said port.

2. In combination, a vehicle having an access port for a linear tool employed to raise and lower a spare tire/wheel assembly from a storage position desirably secured, and a locking/blocking device for said access port including a linear shaft member, said linear shaft member including one end having expandable means carried thereby and adapted to pass axially through said access port to a position behind said access port, said expandable means being elastically expandable to a larger size responsive to actuation, said shaft member being threaded and having an integral connected end adapted not to proceed through said access port, said end including a key means opening for a key means, whereby insertion of said key means and actuation thereof permits rotation of said threaded shaft member to thereby actuate said expandable means, behind said port, to a larger size thereby preventing removal of said threaded shaft member and thereby blocking said access port providing security to said storage position.

3. The combination claimed in claim 2, wherein the expandable means is a surrounding segment of a relatively elastic, resilient material which, when subjected to axial compression, expands radially.

4. The combination as claimed in claim 3, where said expandable means includes a pair of spaced, plate-like members of general circular configuration located on either side of said exapandable means.

5. The combination as claimed in claim 4, wherein said plate-like members are movable toward and away from each other responsive to said key means.

6. The combination as claimed in claim 2, wherein said locking/blocking device includes a cup shaped member having a generally circular base and a marginal collar of annular configuration positioned centrally on such shaft member adjacent said connected end positioned to surround said key connected end.

7. In combination, a vehicle having an access port for a linear tool employed to raise and lower a vehicle spare tire/wheel assembly from a recessed storage position, and a removable lock device for said access port comprising, a plug-like member insertable into and through said access port but leaving a terminal end adapted to not extend through said port, said terminal end including provisions for receiving a removable lug key and, means associated with said plug-like member adapted to extend through said port and, said means constructed and arranged to reversibly expand to a size to frictionally engage the periphery of said port responsive to actuation of said lug key to thereby block said access port, and said means also being constructed and arranged to contract to it's previous size responsive to actuation of said lug key, to thereby permit removal of said plug-like member and allow access to said access port.

* * * * *